G. A. MACBETH.
LENS STRUCTURE.
APPLICATION FILED JAN. 10, 1912.
1,054,854.
Patented Mar. 4, 1913.
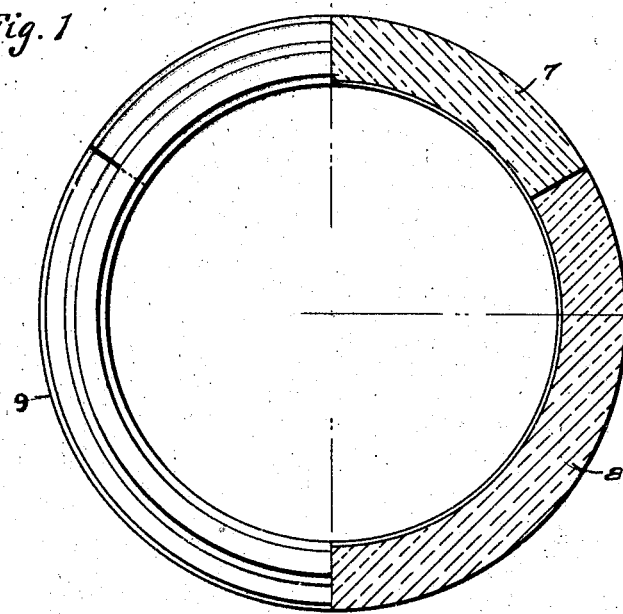
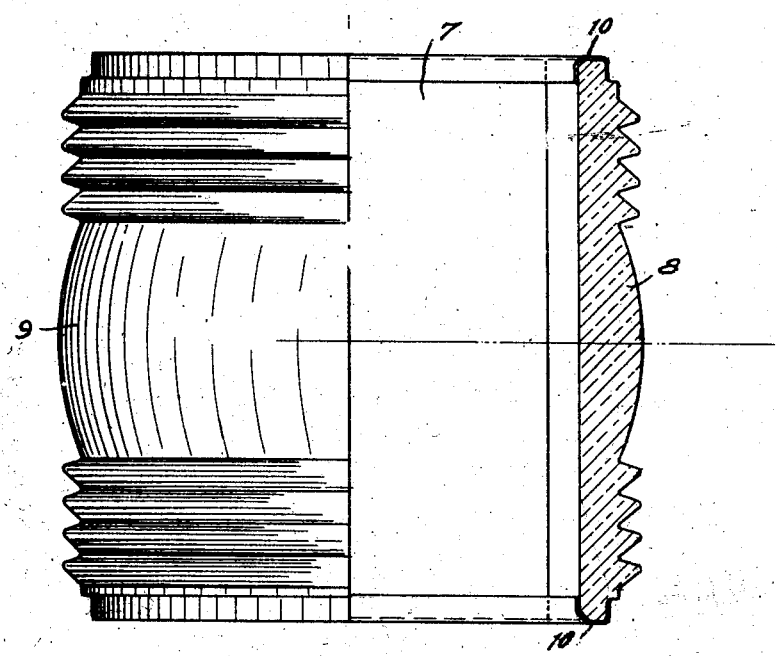
WITNESSES:
INVENTOR.
George A. Macbeth
BY
Paul Synnestvedt
ATTORNEY.

UNITED STATES PATENT OFFICE.

GEORGE A. MACBETH, OF PITTSBURGH, PENNSYLVANIA.

LENS STRUCTURE.

1,054,854. Specification of Letters Patent. Patented Mar. 4, 1913.

Application filed January 10, 1912. Serial No. 670,439.

*To all whom it may concern:*

Be it known that I, GEORGE A. MACBETH, a citizen of the United States, residing at Pittsburgh, in the county of Allegheny and State of Pennsylvania, have invented certain new and useful Improvements in Lens Structures, of which the following is a specification.

This invention relates in general to lens structures, and in particular to signal lenses composed of two or more sections which may be of differently colored glass. It has for its primary objects; the provision of an improved construction of sectional lens wherein the parts are simply but securely held together, and liability of breakage and chipping reduced to a minimum; and the provision of a simple and inexpensive means for securing together the parts comprising a sectional lens of the character described. These together with such other objects as may hereinafter appear or are incidental to my invention, I attain by means of a construction illustrated in preferred form in the accompanying drawings, wherein:—

Figure 1 is a partial plan and sectional view of a lens embodying my invention, and Fig. 2 is a partial side elevation and section of the lens of Fig. 1.

In the drawings, I have illustrated my invention applied to a cylindrical switch lens comprised of three segments of differently colored glass, 7, 8 and 9, which are provided with the usual prismatic and convex portions. Heretofore it has been customary in lenses of this character, either to mount the sections separately in the frame or body of the lamp, or to carefully grind and fit the parts so that they match perfectly, and then mount them in assembled form in machine cut rings in the lamp frame. In constructions of the latter type, the careful grinding required involves quite a large expense and produces an article liable to be easily broken or chipped. The chief aim of my invention is to provide a protection against chipping which will also serve as simple and effective means of securing the sections together, and one which does not require accurate grinding or counter-boring on the rim to match up the parts so that they fit the place in which the lens, when completed, is to be mounted.

In carrying out my invention, I first cement the segments or sections together so that they remain in position, and then electroplate a band of metal, preferably copper, on the upper and lower edges of the glass, the metal being deposited both inside and outside around the edges of the glass, so as to form a ring or double ferrule 10. This ring is clearly indicated in the sectional part of Fig. 2. The ferrule may be electroplated on in any preferred manner, and is of sufficient strength to securely hold the segments together. The advantage obtained by electroplating the band on, is that it is not necessary to have such an accurate finish of the edges, and this eliminates a considerable part of the grinding operations hereinbefore referred to. Besides securing the segments of glass together, the ferrule has the additional advantage of preventing chipping and cracking which commonly results from the rough usage that lamps of this character are subjected to, and is especially liable to occur in lenses made of a plurality of sections, the chipping taking place generally right at the point on the rim where two sections are joined. It will be obvious that the invention can be applied to other types of sectional lenses than the one illustrated.

Having thus described my invention and illustrated its use, what I claim as new and desire to secure by Letters Patent is the following:—

1. A lens structure composed of a plurality of glass sections fitting together and means for securing said sections comprising a metallic band electroplated in position across the juncture of the sections.

2. A cylindrical lens structure comprising a plurality of parti-cylindrical sections fitting together, and means for securing them together comprising a metallic band electroplated on the glass.

3. A cylinder lens structure comprising a plurality of parti-cylindrical sections fitting together, and means for securing them together comprising a metallic electroplated band over the top and the adjacent edges on both sides of the glass.

In testimony whereof I have hereunto signed my name in the presence of the two subscribed witnesses.

GEO. A. MACBETH.

Witnesses:
HARVEY L. LECHNER,
LETITIA A. MYERS.